Patented Feb. 21, 1933

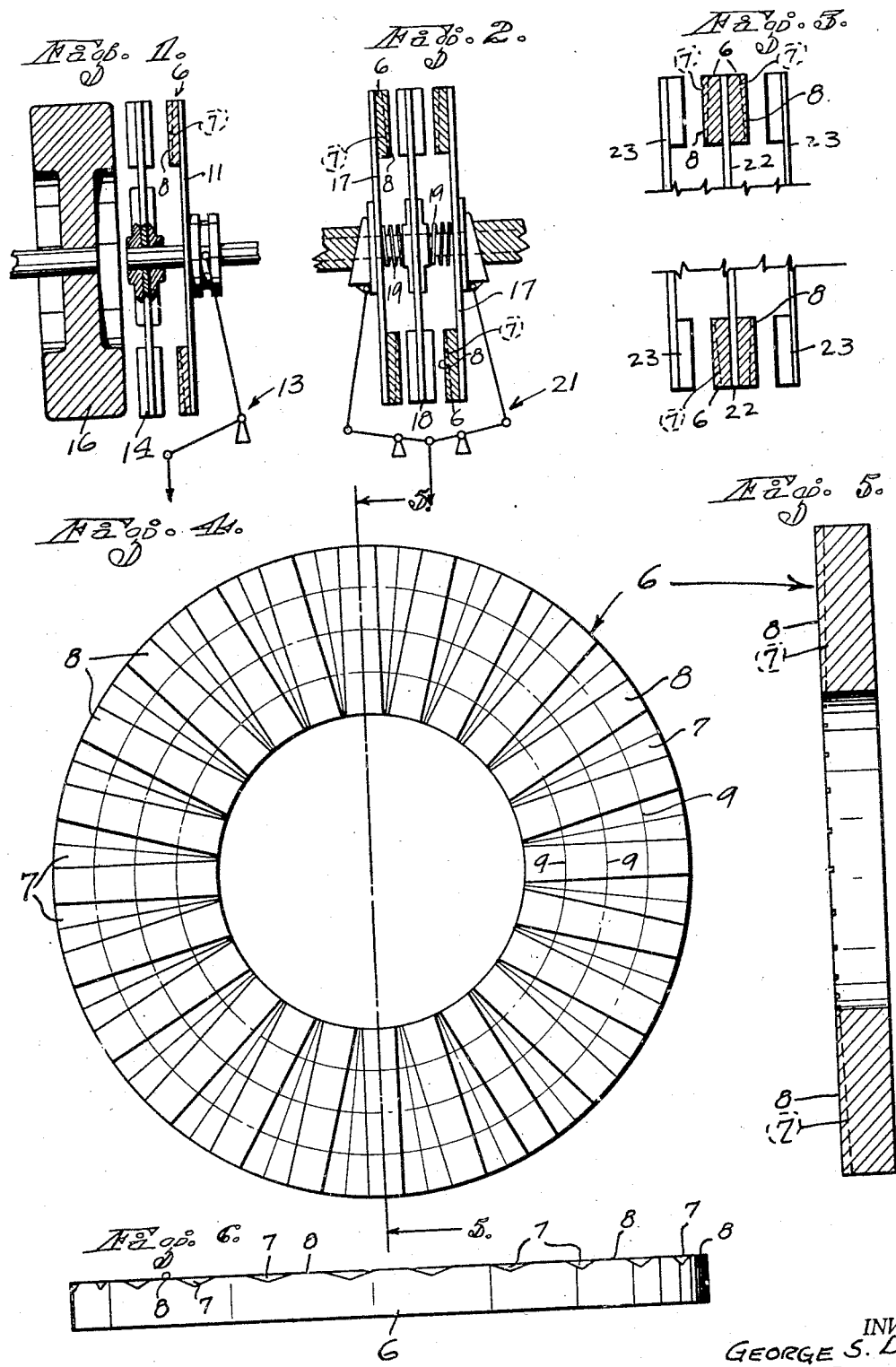

1,898,978

UNITED STATES PATENT OFFICE

GEORGE S. LANE, OF SAN ANSELMO, CALIFORNIA

GROOVED PLATE FOR CLUTCHES AND BRAKES

Application filed April 21, 1931. Serial No. 531,699.

This invention relates to friction plates for use in connection with clutches and brakes of the disc type.

An object of the invention is the provision of a friction plate or disc, the friction face of which is grooved to equalize the circumferential friction area of the plate; this equalization being accomplished by radial grooves, preferably of V shape, dividing the friction surface into a plurality of radial segments which present the same frictional area on any arc at any radial distance from the center of the disc.

Other objects and advantages are to provide friction plates for use in connection with clutches and brakes of the disc type that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly described in the accompanying drawing, wherein:

Fig. 1 is a clutch assembly showing my disc in use as a pressure plate.

Fig. 2 is a brake assembly showing both pressure plates constructed in accordance with my invention.

Fig. 3 is another brake assembly, showing the use of my disc as the central friction disc or mat disc.

Fig. 4 is a face view of the grooved plate constructed in accordance with my invention.

Fig. 5 is a sectional view of the plate, the section being taken on the line 5—5 of Fig. 4.

Fig. 6 is an edge view of the plate.

The invention herein set forth, relates particularly to the type of discs and plates shown in my copending application for friction clutch and brake, filed July 10, 1929, Serial No. 377,314, of which this application is an improved modification.

In carrying out my invention I make use of a ringlike plate 6, a plane face of which forms a friction surface for engagement with the corresponding elements of a clutch or brake, to carry rotary movement to a stationary element, or to retard the rotary movement of a rotary element. In either case an equalization of friction is necessary to equalize the wear on the friction surface. It is also essential that the friction surface should be equalized in such manner as to also eliminate chatter, gear rattle, and other noises attendant to the operation of such devices as heretofore constructed. I accomplish such equalization by, what I call, the correction of the frictional area of the friction face of the plate 6. This correction is achieved by radial grooves 7 extending from the inner periphery of the plate 6 to its outer periphery. The grooves 7 are equally spaced from each other, and are substantially V shaped, with the wider ends thereof located at the outer periphery of the plate 6. The angle between the edges of each groove in such, that the raised segments 8 formed between the adjacent grooves 7 have parallel longitudinal edges, presenting a friction surface of the same width at any radial distance from the center of the plate 6. The grooves 7 form depressions of substantially V shaped cross section so as to progressively deepen transversely to the radii on which the grooves 7 lie.

The result of the aforedescribed "correction" is, that the effective frictional area included between concentric arcs of any mean radius is the same. For instance, if the friction face is divided into four annuluses of equal width by concentric circles 9, the effective friction surfaces in the said annuluses are equal to each other.

In Fig. 1 the plate 6 is mounted on a disc 11 and on a moving hub 12, controlled by the usual clutch control, diagrammatically illustrated at 13. In this form the plate 6 is used as a pressure plate to press a preferably smooth faced, friction or mat disc 14, against the friction face of the fly wheel 16.

In Fig. 2 the opposite pressure plates 17 are provided with the grooved face plate 6 to be simultaneously pressed against the respective facings of a brake disc 18 between the plates 17. The plates 17 are urged apart by springs 19, and are moved toward the disc 18 by a brake applying mechanism diagrammatically shown at 21.

In Fig. 3 the central disc 22 is provided with the "corrected" plates 6 on its opposite friction faces and is disposed between the usual pressure plates 23, actuated in the customary manner.

Having thus described this invention, what I claim and desire to secure by Letters Patent is:

1. A friction disc having a series of spaced, radial, substantially V shaped depressions on a plane face thereof, the wider end of all of the depressions being at the outer periphery of the disc.

2. A ringlike friction facing for a friction disc, having radial grooves extending from the inner to the outer periphery of the facing, said grooves gradually increasing in width from the said inner periphery toward the said outer periphery.

3. A ringlike friction facing for a friction disc, having equally spaced radial grooves extending from the inner to the outer periphery of the facing, said grooves gradually increasing in width from the said inner periphery toward the said outer periphery.

4. A friction disc provided with grooves extended continuously from the inner to the outer periphery thereof, said grooves being so arranged that every concentric arc described around any portion of the face passes over an approximately equal friction area of the face, regardless of the radius of the arc from the center of the disc.

5. A plate for a clutch of the disc type, having a face thereof divided into a plurality of radial segments integral with the plate and extended from the inner periphery to the outer periphery of the friction face thereof, and being arranged to equalize the effective circumferential frictional area throughout said face.

6. A plate for a clutch of the disc type, having a face thereof divided into a plurality of radial segments integral with the plate, the longitudinal edges of each segment being parallel with each other from the inner periphery to the outer periphery of the friction face thereof, and being arranged to equalize the effective circumferential frictional area throughout said face.

In testimony whereof, I have hereunto set my hand at San Francisco, California, this 13 day of February, 1931.

GEORGE S. LANE.